Dec. 23, 1969      H. KAISER      3,485,973

SWITCHING MECHANISM

Filed Aug. 15, 1967      3 Sheets-Sheet 1

INVENTOR
HERMANN KAISER

BY Yount, Raney, Flynn and Tarolli

ATTORNEYS

Dec. 23, 1969  H. KAISER  3,485,973
SWITCHING MECHANISM
Filed Aug. 15, 1967  3 Sheets-Sheet 2

INVENTOR
HERMANN KAISER

BY *Yount, Raney, Flynn and Tarolli*

ATTORNEYS

Dec. 23, 1969      H. KAISER      3,485,973
SWITCHING MECHANISM

Filed Aug. 15, 1967      3 Sheets-Sheet 3

INVENTOR
HERMANN KAISER
BY Young, Raney, Flynn and Tarolli
ATTORNEYS

United States Patent Office 3,485,973
Patented Dec. 23, 1969

3,485,973
SWITCH MECHANISM
Hermann Kaiser, Detroit, Mich., assignor to Eaton Yale & Towne Inc., Cleveland, Ohio, a corporation of Ohio
Filed Aug. 15, 1967, Ser. No. 660,641
Int. Cl. H01h 35/02, 35/14
U.S. Cl. 200—61.45        12 Claims

ABSTRACT OF THE DISCLOSURE

The present switch mechanism has a magnetically attractable armature which is normally held retracted by a permanent magnet at one end and which carries a mobile switch contact at the opposite end for bridging, interlocking engagement with spring fingers on spaced-apart fixed switch contacts when the armature is in an extended position away from the magnet. A stop member is engaged by the armature in its retracted position to provide an adjustable air gap between the magnet pole tips and the armature which determines the decelerating force necessary to displace the armature from this retracted position for movement to its extended position to close the switch.

---

This invention relates to a switch mechanism which is especially adapted for use on a vehicle to actuate a safety device on the vehicle, and in particular relates to a switch mechanism operable in response to a rapid change in acceleration of an automotive vehicle, such as in the event of a collision.

The recent emphasis on automotive safety has led to the development of various safety mechanisms for protecting the occupants of a vehicle during a collision. Such safety mechanisms may be triggered by one or more switch mechanisms on the vehicle which sense and respond to the rapid deceleration of the vehicle. While various switch mechanisms have been proposed heretofore, they are not entirely satisfactory for automative applications for various reasons, such as instability in the operated position of the switch, excessive cost and complexity, and inability to withstand the rugged conditions encountered on automotive vehicles.

Moreover, the operating characteristics of known inertia switches are not entirely satisfactory for automotive use. Known inertia switches will trigger extremely quickly upon receipt of an impulse force existing over a very short period of time. This quick response of known inertia switches would, if used in association with a safety device, cause an actuation of the safety device, even though a non-critical crash was occurring. For example, if an automotive vehicle would collide with a shear pole on a superhighway, the initial impulse on the vehicle due to the collision would be of a relatively high magnitude. However, when the pole shears, the vehicle would be released and the impulse force or deceleration force on the vehicle caused by the collision would act on the vehicle for only a predetermined interval of time. In such a situation, certain safety devices on the vehicle should not be activated. It is extremely important that a sensing device, which activates certain safety devices on an automative vehicle, trigger the safety device only when a critical crash is occurring in which the safety device must be operated for the protection of an occupant of the vehicle.

In order to fully understand the critical operation and the need for a sensing mechanism of the type disclosed in the present application, it is necessary to have some understanding of what happens in an automotive collision. The forces which act on a vehicle during a collision depend on a large number of variables, such as the speed of the vehicle, the mass of the vehicle, the direction in which the vehicle strikes the obstruction, the particular portion of the vehicle which strikes the obstruction, the type of obstruction, and whether the obstruction moves or not as a result of the crash. All of these variables have an effect on the forces which act on the vehicle as well as on a switch mechanism carried by the vehicle. Considering for the moment a collision between two bodies, it is well known that there is, during a collision, a force exerted by each body on the other, which forces are termed action and reaction forces. These forces, however, it is also known, are not constant during the collision, but rather vary through the time interval of the collision. This is true also in a collision between an automobile and an obstruction which may, of course, be another automobile.

It has been found that the magnitude of an impulse force acting on a vehicle during a collision and the time through which that impulse force acts are extremely important to a sensing of a critical crash. A high impulse force may be received by the automotive vehicle, but the force may not act through a sufficiently long time to create a critical crash situation, such as when the vehicle encounters a shear pole on a superhighway. The switch mechanism of the present invention responds not only to an impulse force of a predetermined magnitude, but also the magnitude of the impulse force must remain above a predetermined magnitude for a time interval. As a result, the switch mechanism of the present invention will actuate the safety device with which it is associated when a critical crash is occuring.

Accordingly, the principal object of the present invention is the provision of a new and improved switch mechanism for triggering the actuation of a safety device on a vehicle and which switch mechanism responds reliably to conditions indicating that the vehicle is involved in a critical collision in which an occupant of the vehicle could be seriously injured.

A further object of the present invention is the provision of a new and improved switch mechanism which is primarily adapted for use in operating a safety device on an automotive vehicle and which is adapted to be mounted on the vehicle and which responds to a force which, even through varying, remains above a predetermined magnitude for a time interval during a collision of a vehicle with an obstruction to thereby reliably indicate that a critical crash is occurring.

A still further object of the present invention is the provision of a new and improved switch mechanism adapted for mounting on the body of a vehicle and which is of rugged construction, substantially insensitive to temperature changes throughout the operating range, and which operates reliably, even though subjected to the rugged conditions encountered by the vehicle over a long duration of time.

A more specific object of the present invention is the provision of a new and improved switch mechanism adapted to be mounted on a vehicle and which includes self-cleaning contacts which cooperate to effect a cleaning thereof and thereby increase the reliability of the switch mechanism.

A still further object of the present invention is the provision of a new and improved switch mechanism for use in an automotive vehicle and wherein the contacts have a high degree of stability when closed due to the fact that the contacts are latching contacts and have a locking engagement when the contacts are operated to their closed position; however, there are no latching forces to be overcome until the contacts are closed and thus the latching forces do not resist the closing of the contacts.

Still a further object of the present invention is the provision of a new and improved switch mechanism for use in actuating safety mechanism on a vehicle and which has a high power capacity due in part to the relatively large area of engagement between the contacts thereof.

Further objects and advantages of the present invention will be apparent to those skilled in the art to which it relates from the following detailed description of preferred embodiments thereof and which description is made with reference to the accompanying drawing in which.

The present invention provides an improved switch mechanism primarily for use in actuating safety devices on vehicles, such as automobiles and airplanes. The switch mechanism is responsive to forces acting on the vehicle as a result of a collision and activates the safety device for the protection of an occupant of the vehicle during the collision. The safety device which is actuated by the switch mechanism may take many forms.

Figure 1:
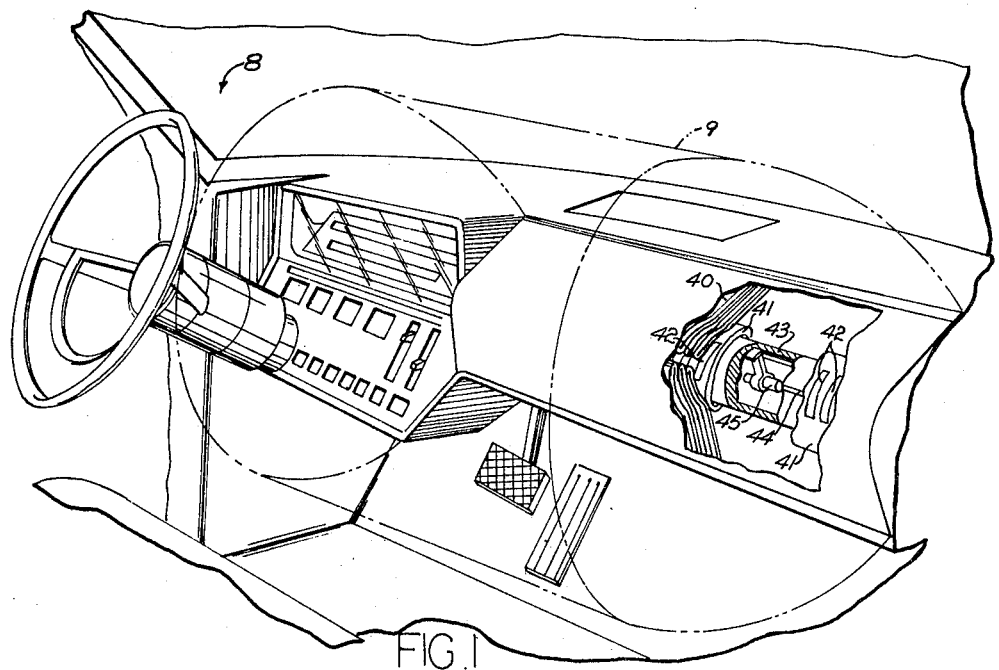
FIG. 1 is a fragmentary perspective view showing the dashboard of an automobile carrying a safety device in the form of an inflatable cushion.
Figure 2:
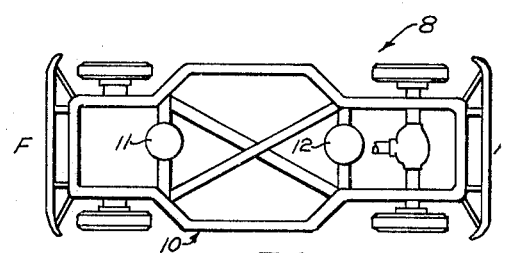
FIG. 2 is a bottom plan view showing the frame of the automobile carrying front and rear switch mechanisms of the present invention.

As representing the use of the switch mechanism, FIG. 1 of the drawing illustrates an automotive vehicle 8 incorporating a safety device 9 in the form of an inflatable cushion device which is shown in dot-dash lines inflated in response to actuation of a switch mechanism embodying the present invention. Referring to FIG. 2, the frame 10 of the automotive vehicle is shown carrying a pair of switches embodying the present invention and which are indicated schematically at 11 and 12, respectively, toward the front and back of the passenger compartment in the vehicle. The switches 11 and 12 could be mounted at other locations, as desired.

Figure 3:
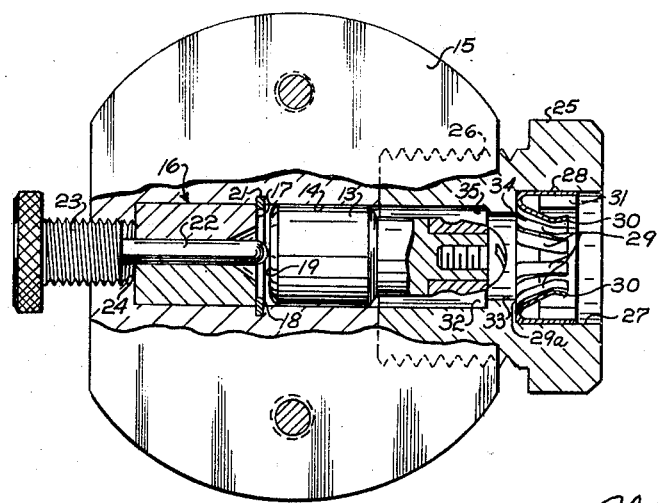
FIG. 3 is a view showing in longitudinal section the operating parts of a switch mechanism embodying the present invention.

As shown in FIG. 3, each of the switches 11, 12 comprises a magnetically attractable mass in the form of an armature or plunger 13 which is longitudinally slidable in a bore 14 in the switch housing 15. At its left end in FIG. 3, the bore 14 snugly receives a permanent magnet 16 having spaced coplanar north and south pole faces 17 and 18, respectively, which face toward the back end face 19 of the armature 13. These magnet pole faces engage a suitable abutment, such as the snap ring 21, in the housing bore 14. The bore 14 lies in a horizontal plane when the switch is mounted in the vehicle, and the housing 15 is provided with suitable means, such as bolts, etc., for securing it to the vehicle.

A stop pin 22 extends freely through a longitudinal bore in the magnet 16 and presents a rounded inner end for engagement with the back end face 19 of the armature 13 inwardly past the snap ring 21. The stop pin 22 is suitably mounted in the housing and is shown by way of example as attached to a screw threaded shank 23 which is threadedly received in a screw threaded opening 24 in the left end of the switch housing leading into the bore 14. With this arrangement, the air gap between the magnet pole faces 17 and 18 and the back end face 19 of the armature 13, when the armature is fully retracted against the stop pin 22, may be adjusted by turning the shank 23 in one direction or the other. The length of this air gap determines the magnetic force which the magnet 16 exerts against the magnetically attractable armature 13.

Figure 4:
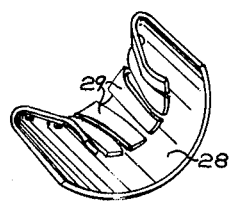
FIG. 4 is a perspective view showing one of the fixed latching contacts embodied in the switch mechanism shown in FIG. 3.

At the opposite side of the housing 15, an annular plug 25 is threadedly received in a screw-threaded opening 26 which opens into the right end of the housing bore 14. This plug 25 has a circular recess 27 in its outer end which snugly receives a spaced pair of fixed latching contacts. Each of these fixed contacts preferably is constructed as shown in FIG. 4 and comprises an arcuate outer wall 28 which extends through slightly less than a half-circle, and a plurality of circumferentially-spaced, cantilevered spring fingers 29 which are connected integrally to the axially inward end of the arcuate wall 28. As shown in FIG. 3, the arcuate wall 28 of the fixed contact has a snug fit against the wall of the recess 27. Each of the spring fingers 29 inclines longitudinally and radially inward from the outer wall 28 and terminates in a free end segment 30, which is inclined longitudinally and radially outward and is spaced appreciably inward radially from the outer wall 28. As shown in FIG. 3, a relatively thick, rigid, arcuate piece 31 of high electrical conductivity material is attached to the inside of the outer wall 28, spaced from the spring fingers 29 on this switch contact. The two fixed contacts are fixedly positioned within the recess 27 with their respective adjacent ends spaced apart circumferentially, so that they are physically and electrically separated from one another.

The armature 13, which moves in the bore 14, has a reduced front end portion 32 (FIG. 3) which carries an annular mobile contact member 33 of suitable high electrical conductivity material. The mobile contact member 33 has a sliding fit over this front end portion 32 of the armature and it is retained thereon by a staked fit.

Figure 5:
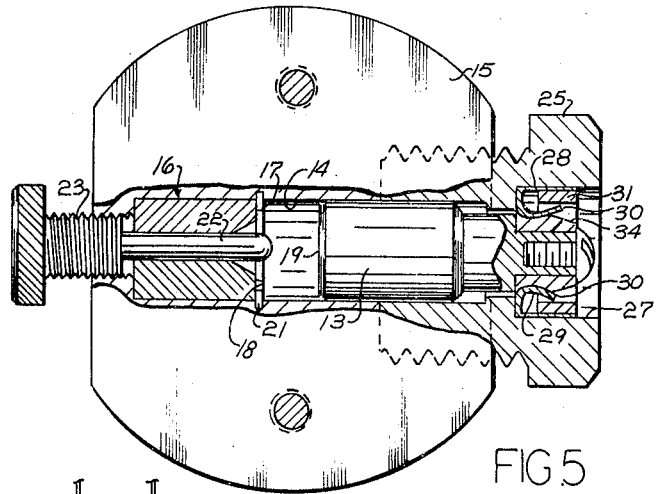
FIG. 5 is a view showing partly in longitudinal section and partly in elevation, the switch of FIG. 3 in the actuated condition.

The mobile contact member has a tapered front end portion 34 which is shaped and dimensioned to engage and spread apart the spring fingers 29 on the two fixed latching contacts when the armature 13 moves from the retracted position (FIG. 3) to the extended position shown in FIG. 5. Immediately behind its tapered front end portion 34, the mobile contact member 33 presents a rounded peripheral groove 35 which is lockingly engaged by the respective spring fingers 29 when the armature has moved to its extended position, as shown in FIG. 5. In this position, the spring fingers 29 are deformed radially outward and they frictionally engage the mobile contact 33 along the groove 35 therein with sufficient force so that the armature 13 is effectively locked in this extended position and cannot return to its retracted position even if the force, which originally displaced it to the extended position, is now diminished. In this extended position of the armature 13, the mobile contact 33 closes the electrical circuit between the two fixed contacts.

The fact that the tapered front edge portion 34 of the mobile contact member 33 frictionally engages the spring fingers 29 as the mobile contact moves to the position illustrated in FIG. 5 results in an abrasive action between the surfaces of the tapered end portion 34 of the mobile contact and the surfaces of the spring fingers through which current flows. This action results in removal of dirt and other foreign matter which may be on the contacts, thus adding to the reliability of the actuation of the safety device on movement of the armature 13. In this respect, the contacts are self-cleaning.

In view of the fact that the contacts are self-cleaning and have the latching relationship when the armature 13 moves to the position shown in FIG. 5, there is, of course, no rebound of the armature away from the contacts after a momentary closing of the contacts. As a result, no momentary current flows, but rather a continuous current flows.

Moreover, it should be apparent from the above that in order to effect latching of the contacts, a force must be applied to the fixed contacts which is sufficient to overcome and spread the spring fingers 29. Thus, any resistance to latching of the contacts occurs after the contacts have closed and as a result, there is no force to be overcome to effect latching of the contacts prior to engagement of the contacts. Such a force would, of course, effect the operation and movement of the mobile contact, and therefore the latching of the contacts is effected by a construction which does not affect performance of the switch mechanism.

Furthermore, the construction of the contacts is such as to provide a high power capacity, making the switch mechanism quite suitable for actuating a plurality of safety devices. The high power capacity results from a number of considerations including the material of which the contacts are made, namely, a beryllium copper alloy, and the area of engagement of the contacts. It should be clear that there is a substantial area of engagement between the fixed contacts and the mobile contact 34, primarily because of the circumferential disposition of the plurality of spring fingers 29 around the mobile contact 34.

The combination of the latching contacts and the self-cleaning of the contacts makes the switch particularly adaptable for use in an automotive vehicle where it may operate to actuate a plurality of safety devices only after a long duration of time, during which time the switch would be subjected to rugged terrain and all sorts of weather conditions. The housing 15 of the switch mechanism is made of a plastic material, thus making it insensitive to temperature. This, in combination with the contact construction, makes the switch particularly adaptable to all conditions encountered by mounting on an automobile.

It should be apparent from the above that in the event of a collision involving the vehicle 8 in which the switch mechanism embodying the present invention is mounted, the armature 13 of the switch will tend to move relative to the magnet 16 in the horizontally extending bore 14. The collision may be one wherein the vehicle 8 may be moving and collide with either a moving or fixed obstruction, or may be one in which the vehicle 8 is at rest and is hit by another moving vehicle. In both cases, there is relative movement between the vehicle 8 and the obstruction, whether the obstruction be another vehicle or a fixed obstruction.

Figure 12:
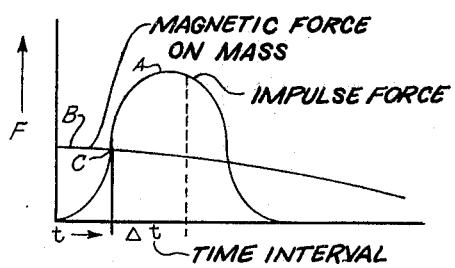
FIG. 12 is a graphical representation showing characteristics of operation of the switch mechanism of the present invention.

As a result of the impact of the collision, it is well known that there is an impulse force acting on the vehicle due to the collision and which force is not of a constant magnitude. Referring to FIG. 12, the curve labelled "A" may be considered the impulse force which acts on the vehicle during the collision. It should be noted that the impulse force at the instant of impact is zero and increases to a peak and then decreases back to zero. While the impulse curve shown in FIG. 12 is somewhat idealistic in view of the various parameters mentioned above with regard to the impulse force, however, for purposes of illustration, it is believed sufficient. The impulse force acting on the vehicle acts, of course, on the switch mechanism, resulting in relative movement between the armature 13 and the magnet 16, if the impulse force is sufficiently great and acts over a sufficiently long time interval to overcome the force of attraction between the armature 13 and the magnet 16. This would depend on a number of factors including the direction of the impact force with respect to the axis of the bore 14. A dampening fluid may be utilized to dampen movement of the armature, if desired.

It should be apparent that as the armature 13 moves relative to the magnet 16, the air gap between the armature and the magnet increases with, of course, a corresponding decrease in the force applied by the magnet to the armature. The curve of the magnetic force applied to the armature 13 is labelled "B" in FIG. 12. It should be noted that during the initial portion of the crash, when the impulse force is below that sufficient to break the armature 13 away from the magnet 16, the curve of the magnetic force acting on the mass is, of course, constant, since there is no change in the air gap. The point at which the armatur 13 begins to move relative to the magnet is the point at which the impulse force exceeds the force applied to the armature by the magnet. This point is designated "C" in FIG. 12.

As the armature 13 tends to move relative to the magnet 16, the magnet applies a restraining force to the armature 13, restraining movement of the armature 13 toward the switch contacts. Since the magnet 16 urges and continues to urge, the armature 13 toward it, even while the armature moves, the impulse force as a result of the collision must be maintained above the force of magnetic attraction between the armature and the magnet for a sufficient time interval for the armature to become latched. This time interval is indicated on the drawing, in FIG. 12, as Δt and as long as the impulse force acting on the vehicle is maintained above the magnetic force of attraction for that time interval, the armature will move to effect closing of the contacts. The various parameters of the strength of the magnet and the mass of the armature, as well as the distance at which the armature 13 must move to close the contacts, have a relationship to the time interval. These parameters must be such that the impulse force, even though varying, remains above the force of magnetic attraction between the magnet and the armature for a sufficient time interval.

If the vehicle would encounter an impulse force of sufficient magnitude to start the armature moving and the time interval at which the impulse force remains above the force of magnetic attraction is less than the critical time interval, then the armature is attracted back to the magnet and no triggering of the safety device occurs. Such may be the case, if the vehicle encounters a shear pole on a highway, as discussed above.

Figure 8:
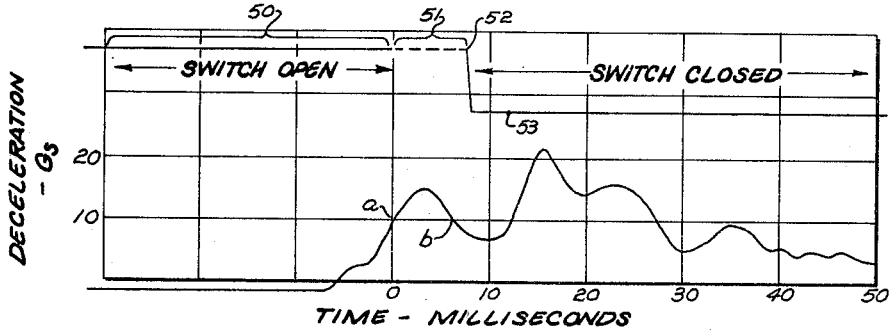
FIGS. 8, 9, 10 and 11 are graphical representations showing the response of the present switch mechanism under various conditions of deceleration.

FIGS. 8–11 show the performance of this switch under various conditions of deceleration. In each of these figures, the air gap adjustment of the inertia switch was chosen so that the armature would move in response to a deceleration of 10 G's, and other adjustments may be effected so that the armature moves at a different deceleration. Referring first to FIG. 8, initially the switch was open (that is, the armature 13 was held retracted by the magnet 16, as shown in FIG. 3) while the switch was subjected to a positive acceleration and until the deceleration force was increased to 10 G's. This condition of the switch is indicated by the line 50 in FIG. 8. As soon as the deceleration exceeded 10 G's, at point a on the FIG. 8 deceleration curve, the armature 13 moved away from the magnet 16, as indicated by the dashed line 51 in FIG. 8, and it continued to move away from the magnet, even though the deceleration force dropped below 10 G's, at the point b on the FIG. 8 deceleration curve.

The point 52 at the end of the dashed line 51 in FIG. 8 indicates the time at which the mobile contact 33 on the armature first made contact with the spring fingers 29 on the two fixed switch contacts. The point 53 on the FIG. 8 deceleration curve indicates the time at which the armature had completed its movement to its extended position, where the spring fingers 29 on the fixed contacts were in full latching engagement with the mobile contact 33 on the armature at the peripheral groove 35, as shown in FIG. 5. The total movement of the armature from its fully retracted position to its latched position took place in about 8 milliseconds. It should be noted that, even though the decelerating force dropped below the critical value of 10 G's (at point *b*) before the armature reached its fully latched position (at point 53), this did not affect the closing of the switch.

After the point 53, at which the armature was fully latched, it remained in this position throughout the subsequent changes in the decelerating force from an initial minimum of about 7 G's up to a peak of about 22 G's, and followed by a fluctuating decrease down to a value of about 4 G's at the end of 50 milliseconds after the armature first broke away from the magnet 16.

Figure 9:
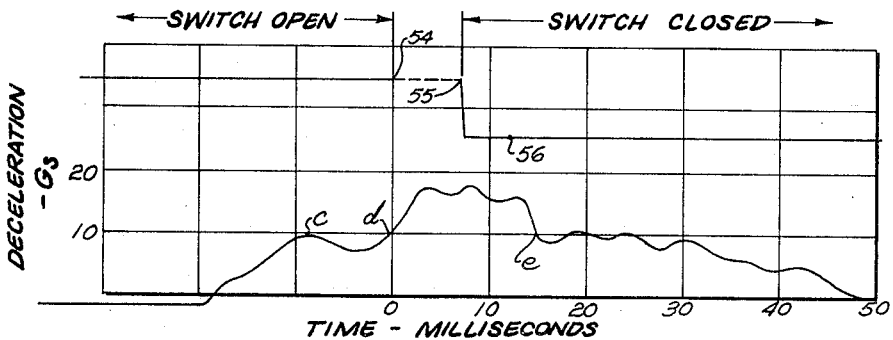

FIG. 9 shows another performance curve of the FIG. 3 switch. In FIG. 9, the switch was subjected to a deceleration force which increased to a peak of about 9 G's (at point *c*), but this was insufficient to dislodge the armature 13 away from the magnet 16. A later increase of the decelerating force through the critical 10 G value (at point *d*) caused the armature to begin moving away from the magnet, at point 54 on the switch performance curve in FIG. 9. After about slightly less than 7 milliseconds, at point 55, the mobile switch contact 33 on the armature first engaged the spring fingers 29 on the fixed switch contacts. At point 56, the mobile contact 33 was fully interlocked with the fixed contacts as shown in FIG. 5. The decelerating force was above 10 G's throughout the movement of the armature from its retracted position to its extended position. Thereafter, the switch remained fully closed even though the decelerating force dropped below the critical value of 10 G's at point *e* on the FIG. 9 deceleration curve, and then diminished in a fluctuating manner down to zero.

Figure 10:
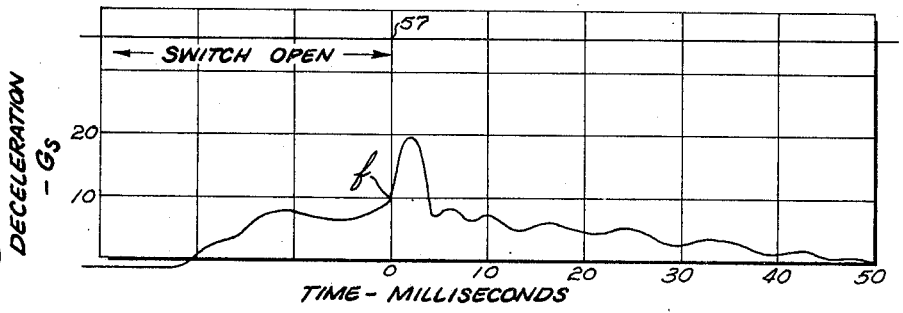
Figure 11:
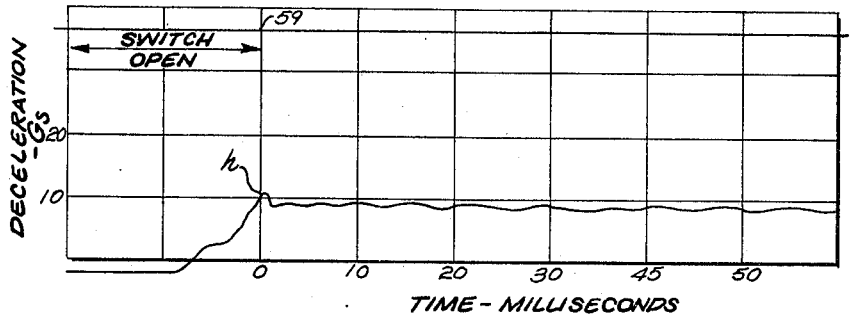

FIGS. 10 and 11 illustrate performances in which the contacts did not close. As shown in FIG. 10, the critical 10 G deceleration force is exceeded, at point *f*, and the armature 13 begins moving away from the magnet 16, at point 57 on the switch performance curve in FIG. 10. The deceleration force, however, did not remain sufficiently high for a sufficient time for the contacts to fully close. Thus, the switch contacts remained open throughout.

FIG. 11 illustrates the results of a deceleration test on the present switch which are basically similar to the results shown in FIG. 10. In FIG. 11, the decelerating force exceeds 10 G's, at point *h*, and the armature 13 begins moving away from the magnet 16, at point 59 on the switch performance curve. However, the decelerating force immediately drops below the 10 G's and remains substantially constant throughout and the contacts do not close. In both performances of FIGS. 10 and 11, the armature returns to its initial position by the magnet.

From these test results, it will be evident that a critical condition affecting the operation of the present switch is the particular deceleration value for which the air gap between the magnet pole tips 17, 18 and the adjacent end face 19 of the armature 13 has been set. Whenever this critical decelerating force is first exceeded, the armature will begin moving away from the magnet and it will continue to the fully-closed switch position as long as the force on the armature is maintained above the magnetic force of attraction between the magnet and armature. If the force does not act for a sufficient time interval, the armature will be returned to its initial position. Conceivably the forces acting on the armature could be such that the armature does not return but hunts in intermediate positions. Once the contacts are closed, the contacts will remain latched in the fully-closed switch position, whether the decelerating force goes well above or below the critical level.

The inertia switch just described is used to trigger the vehicle safety mechanism 9 shown in FIG. 1. It is to be understood that the FIG. 1 mechanism is just one of many different types of safety equipment on automotive vehicles with which the present inertia switch may be used, and that the present switch is not limited to this particular use. The safety mechanism 9 specifically includes an inflatable confinement 40, shown by way of example as mounted in an opening in the dashboard of the vehicle. Normally, the confinement is folded up in accordian fashion as shown in full lines. When inflated, it expands out to the phantom-line position in FIG. 1, in which it projects rearward from the dashboard to provide protection for the passengers in case of a critical collision.

The confinement is attached to an outer rigid tube 41 which has a plurality of arcuate openings 42. An inner rigid tube 43 is positioned within the outer tube. The inner tube contains a suitable compressed gas and it has a longitudinally extending, elongated depression 44 at which the wall thickness is substantially reduced, so that the tube will burst first at this depression. An explosive charge 45 is positioned inside the inner tube 43 and it is connected to a source of electrical energy, such as a battery, through the fixed contacts of the present inertia switch. When the vehicle undergoes a deceleration in excess of the critical value, the switch will close and thereby complete the circuit from the battery to the explosive source 45. The explosion produced by the latter will burst the inner tube 43 along the depression 44, and the compressed gas will escape into the outer tube 41 and through the openings 42 in the latter into the confinement 40, inflating the confinement to the dashed line position in FIG. 1.

Figure 6:
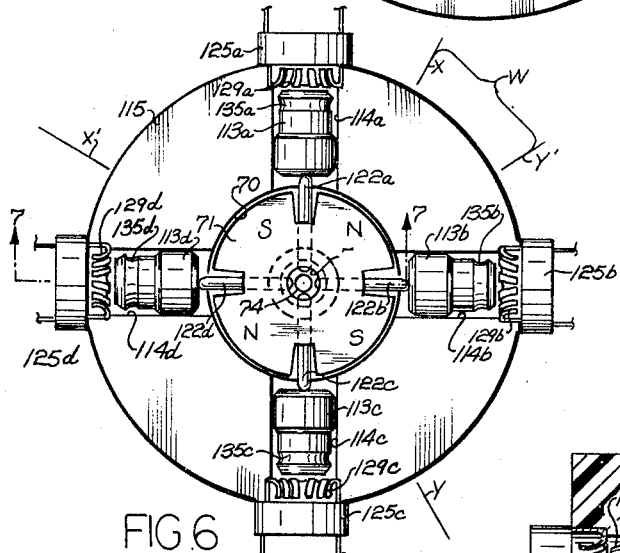
FIG. 6 is a top elevational view of a switch assembly which embodies four switch mechanisms of the general type shown in FIG. 3, and arranged to provide maximum sensitivity of response in four different directions at 90-degree intervals.
Figure 7:
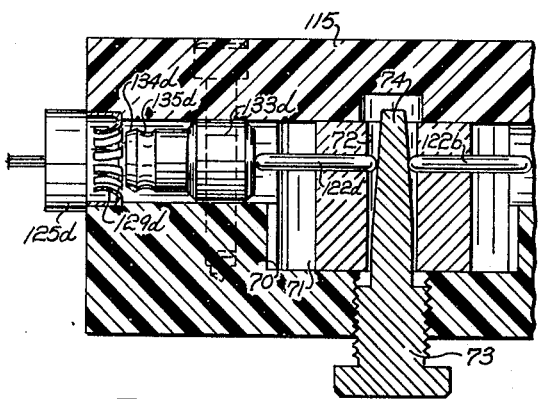
FIG. 7 is a section through the FIG. 6 switch assembly taken along the section line 7—7.

FIGS. 6 and 7 show a multiple inertia switch assembly in accordance with the present invention, comprising four inertia switches, as shown for illustration purposes, as arranged for maximum sensitivity in four different directions spaced apart at 90-degree intervals circumferentially. The interval could be other than 90 degrees and more or less than four switches could be used. Such a switch assembly may be used on an automotive vehicle to sense a collision at the front, back or either side of the vehicle. This switch assembly comprises a housing 115 having four bores 114*a*, 114*b*, 114*c*, 114*d* extending laterally at 90-degree intervals around the circumference of the housing. Each of these bores contains an individual inertia switch of the type already described in detail with reference to FIGS. 3–5. Corresponding elements of these switches are given the same reference numerals as in FIG. 3, plus 100, and with the appropriate suffix "*a*," "*b*," "*c*" or "*d*." The detailed description of the construction and operation of these switches will be omitted as unnecessarily repetitious.

The housing 115 has a centrally located recess 70 at the laterally inward ends of the bores 114*a*, 114*b*, 114*c* and 114*d*. This recess receives an annular permanent magnet 71 having circumferentially spaced alternate north and south pole faces with a set of north and south pole faces at the inner end of each bore 114*a*, 114*b*, 114*c* or 114*d* for holding the respective armature 113*a*, 113*b*, 113*c* or 113*d* retracted.

The respective stop pins 122*a*, 122*b*, 122*c* and 122*d* are slidably disposed in respective cross bores in the magnet 71, with their laterally outward ends engaging the laterally inward ends of the respective plungers 113*a*, 113*b*, 113*c* and 113*d* to provide an air gap between each plunger and the respective pair of north and south pole faces of the magnet 71. The inner ends of the stop pins project into an axial bore 72 in the magnet. An adjustment member 73 is screw-threadedly mounted on the housing 115 and it presents a tapered inner end segment 74 disposed within the bore 72 and engaging the inner ends of the stop pins 122*a*, 122*b*, 122*c* and 122*d*. This inner end segment 74 has a periphery which is conical about the longitudinal axis of member 74, which axis coincides with the axis of the bore 72. Consequently, when the adjustment member 73 is turned to advance its inner end farther into the magnet 71, the stop pins 122*a*, 122*b*, 122*c* and 122*d* are forced laterally outward to increase the air gaps in the four switches substantially by the same amount. Conversely, when the adjustment member 73 is turned in the opposite direction, the stop pins move laterally inward under the urging of the switch plungers 113a, 113b, 113c, 113d, which are attracted by the magnet 71, to reduce the air gaps in the four switches by the same amount.

With this arrangement, the deceleration or impact force necessary to operate the switches may be adjusted simultaneously for all four switches by this simple and rugged adjustment arrangement.

The switch mechanism shown in FIGS. 6 and 7 provides a high degree of reliability for collisions where the forces acting on the switch lie in a particular area. More specifically, each of the switch devices is responsive to forces acting in a sensitive envelope of a particular size. The sensitivity envelope for the switch, including the armature 113b is designated by the area between the lines $x$ and $y$ illustrated in FIG. 6. The sensitive envelope for the switch, including the armature 113a, is designated by the area between the lines $x'$ and $y'$. Forces acting in these sensitivity envelopes will cause actuation of the associated switch mechanism depending, as described above, on the magnitude and duration of the force.

It should be noted that the area in FIG. 6 designated $w$ is an area which is included in the sensitivity envelopes for both switches. Thus, a force acting on the switch mechanism and lying in the area $w$ would theoretically cause actuation of both switches. Therefore, if the switch were mounted so that the forces as a result of a head-on collision would act through the sensitivity area $w$, then both switches theoretically would be actuated for a head-on collision. As a result, reliability is achieved because in the event of some malfunction of one of the switches, the other switch may be actuated for such a collision. Thus, in a collision wherein a force of a sufficient magnitude and duration acts through the area $w$, there is a great reliability for actuation of the safety mechanism since either one or the other of the switches or both may be operated to actuate the safety mechanism.

While a presently preferred embodiment of the present switch has been described in detail with reference to the accompanying drawing and with reference to a particular practical application of the switch, it is to be understood that the switch is susceptible of other structural embodiments differing from the particular embodiment disclosed and may be used in environments other than that disclosed without departing from the spirit and scope of the present invention.

What is claimed is:

1. A switch mechanism comprising a permanent magnet presenting substantially coplanar pole tips of opposite magnetic polarities, a magnetically attractable armature having one end thereof in confronting relationship to said pole tips of the magnet and magnetically attractable by the latter, said armature being mounted for longitudinal reciprocation toward and away from said magnet pole tips, a stop member positioned for engagement by said end of the armature when the latter is retracted toward the magnet to provide an air gap between said magnet pole tips and said end face of the armature, an annular mobile contact member of high electrical conductivity material mounted on the opposite end of the armature, said mobile contact member having a tapered front end portion and having a peripheral groove behind said tapered front end portion, and a pair of fixed latching contacts positioned for engagement by said mobile contact member when the armature moves away from said magnet, said latching contacts being spaced apart from one another circumferentially of said mobile contact member on the armature, each of said latching contacts comprising an outer wall and a plurality of circumferentially spaced, flexible and resilient spring fingers which are attached integrally to the end of said outer wall which is disposed toward said mobile contact on the armature, each of said spring fingers extending in cantilever fashion from said outer wall and inclining longitudinally and radially inward therefrom and terminating in a free end which is disposed longitudinally away from said mobile contact member on the armature when the latter is retracted toward the magnet and being spaced radially inward from the respective outer wall, said spring fingers on the latching contacts being positioned to be engaged and deformed radially outward by said tapered front end portion on the mobile contact member when the armature moves away from the magnet and to resiliently interlock with said mobile contact member at the peripheral groove thereon when its tapered front end portion moves past the free ends of the spring fingers, said permanent magnet urging said armature to an initial position with a constantly decreasing force as said armature moves to effect engagement of said contacts and operable to return said armature to the initial position in the event that the force causing movement of the armature does not have a magnitude greater than the magnitude of the force applied to the armature by said permanent magnet for a time interval.

2. A switch mechanism as defined in claim 1 wherein said stop member is adjustable to selectively vary the air gap between said magnet pole tips and said one end of the armature.

3. A switch mechanism comprising housing means, a plurality of switches in said housing means comprising a plurality of magnetically attractable armatures mounted for movement respectively laterally of said housing means in circumferentially spaced directions, a plurality of magnets positioned laterally inward of the respective armatures for holding the latter retracted laterally inward on said housing means, each armature carrying a mobile contact member, a plurality of latching contact means positioned laterally outward from the respective magnets for engagement by the mobile contact member on the respective armature when the latter moves laterally outward away from the respective magnet, a plurality of laterally extending stop members disposed laterally inward from the respective armatures and engageable with the laterally inward ends of the latter to provide an air gap between the armature and the respective magnet when the armature is retracted, and an adjustment member having a tapered surface which is engageable with the laterally inward ends of said stop members, said adjustment member being adjustably mounted on said housing means to adjust said air gaps simultaneously.

4. A switch mechanism as defined in claim 3 wherein said housing is made of a plastic material making it substantially insensitive to temperature, and includes means for mounting said housing on the frame of an automotive vehicle.

5. A sensor mechanism for actuating a safety device on a vehicle comprising housing means, a plurality of sensor devices supported in said housing means, each of said sensor devices including a mass supported for movement relative to said housing means, each mass being movable linearly along a sensitivity axis due to a force resulting from a collision, restraining means for each mass urging said mass to a first position with a constantly decreasing force as said mass moves to a second position and operable to return said mass to said first position in the event that the impulse force does not have a magnitude greater than the magnitude of the force applied to the mass by said restraining means for a time interval, each of said sensor devices having a sensitivity envelope and a force acting through said sensitivity envelope actuating movement of said mass, the sensitivity envelopes of adjacent sensor devices overlapping to provide a common sensitivity area such that a force acting through said common sensitivity area acts to effect movement of each of said masses, and means for simultaneously adjusting each of said sensor devices to vary the force which said restraining means applies to each of said masses to thereby vary the magnitude of the force required to move said masses to their second positions.

6. A switch mechanism as defined in claim 1 wherein said mobile contact member and said latching contacts comprise self cleaning contacts due to sliding frictional engagement of surface portions of said spring fingers with said tapered front end portions of said armature.

7. A switch mechanism as defined in claim 1 further including a housing having a substantially horizontal bore therein, and said armature being located in said horizontal bore and movable therein in response to said impact force and said permanent magnet is located in one end of said bore.

8. A switch mechanism as set forth in claim 3 wherein each of said switches has a sensitivity envelope with each of said armatures being movable under the influence of a force acting through the associated sensitivity envelopes to actuate the associated switch, the sensitivity envelopes of adjacent switches overlapping to provide a common sensitivity area such that a force acting through the common sensitivity area acts to effect movement of the armatures of the adjacent switches.

9. A switch mechanism as set forth in claim 3 wherein each of said stop members is slidably mounted on an associated one of said plurality of magnets, said stop members being moved relative to said magnets by said adjustment member to thereby adjust said air gaps.

10. A sensor mechanism as defined in claim 3 wherein said housing means includes a plurality of bores, each armature being located in one of said bores and movable linearly therein, and said bores having fixed contacts supported at one end thereof and said armature upon movement completing said contacts.

11. A sensor mechanism as set forth in claim 5 wherein each of said sensor devices includes a pair of fixed latching contacts positioned for engagement by an associated one of said masses when the mass moves away from said restraining means, each of said latching contacts comprising an outer wall and a plurality of circumferentially spaced, flexible and resilient spring fingers which are attached integrally to the end of said outer wall, each of said spring fingers extending in cantilever fashion from said outer wall and inclining longitudinally and radially inward therefrom and terminating in a free end which is spaced radially inward from the respective outer wall, said spring fingers on the latching contacts being positioned to be engaged and deformed radially outward by the front end portion on the associated mass when the mass moves away from said restraining means and to resiliently interlock with the mass at a peripheral groove thereon when its front end portion moves past the free ends of the spring fingers.

12. A sensor mechanism as set forth in claim 5 wherein said restraining means for each of said masses includes a plurality of magnets, each of said sensor devices including a stop member for engaging an associated one of said masses to provide an air gap between the mass and an associated one of said magnets, said means for simultaneously adjusting each of said sensor devices including means for simultaneously moving said stop members to thereby adjust said air gaps.

References Cited

UNITED STATES PATENTS

| | | | |
|---|---|---|---|
| 2,203,061 | 6/1940 | Schmettow | 200—61.48 |
| 2,744,976 | 5/1956 | Black | 200—61.53 X |
| 2,997,557 | 8/1961 | Gillmor et al. | 200—61.45 |
| 2,997,883 | 8/1961 | Wilkes | 200—61.53 X |
| 3,132,220 | 5/1964 | Uri et al. | 200—61.45 |

ROBERT K. SCHAEFER, Primary Examiner

R. A. VANDERHYE, Assistant Examiner

U.S. Cl. X.R.

200—61.53